June 26, 1962 — J. HARAST — 3,041,377
MANUFACTURE OF AROMATIC AMINES FROM NITRO COMPOUNDS
Filed Nov. 17, 1958
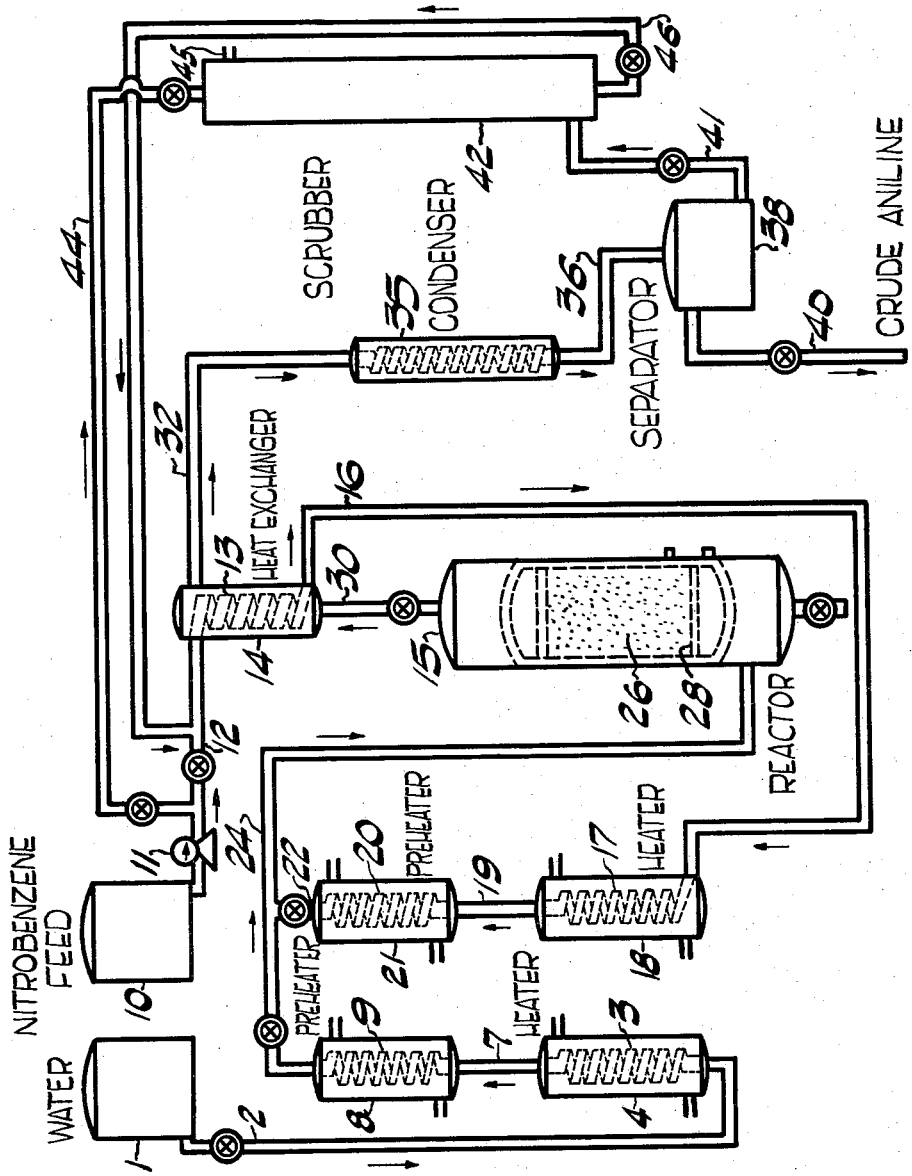
JOSEPH HARAST
INVENTOR.
BY Roy S. Story
Attorney

3,041,377
MANUFACTURE OF AROMATIC AMINES FROM NITRO COMPOUNDS
Joseph Harast, 2223 S. 21st Ave., Broadview, Ill.
Filed Nov. 17, 1958, Ser. No. 774,285
6 Claims. (Cl. 260—580)

This invention relates to the manufacture of amines from aromatic nitro compounds and has to do particularly with the conversion of nitrobenzene to aniline.

Aniline is commonly made by the reduction of nitrobenzene using hydrogen derived from treating iron borings with acid, and a nickel catalyst. The catalytic reduction may be carried out in either the liquid or vapor phase. In addition to hydrogen, other gases containing hydrogen, such as water gas, or gases capable of producing hydrogen from water, such as carbon monoxide, may be used when operating in the vapor phase.

The present invention comprises improvements in the vapor phase treatment of nitro aromatics in the presence of reducing gases whereby the nitro compounds are converted to the corresponding amines in a more simple and economical operation than the methods of the prior art.

Heretofore, it has been customary to generate the hydrogen separately and then contact the resulting hydrogen and vapors of the nitro compounds with a catalyst.

An object of the present invention is to provide a method of reducing aromatic nitro compounds in the vapor phase whereby the step of separately producing the reducing gas is eliminated.

Also an object of the present invention is to convert aromatic nitro compounds into the corresponding amines in a continuous-one-step operation.

A further object of the present invention is to produce amines from aromatic nitro compounds by a process wherein the nitro compounds are reduced to amines by reducing gases generated in situ during the operation.

Other objects will be apparent from the following description of the process of the invention and of the illustrative drawing of a system for carrying out the process.

The invention will be described as applied to the production of aniline from nitrobenzene, but it will be understood that this description of the process and the examples for conducting the process are for purposes of illustration, and that the process of the invention is not limited to the production of aniline or to the use of the particular equipment described.

In accordance with one aspect of the invention advantage is taken of the heats of reaction inherent in the chemical reactions involved in the process. Without restricting the invention to any particular theory, the invention will be understood more clearly in connection with the following discussion of possible reactions, including those involved in the production of water gas.

The over-all water gas reaction is endothermic and is ordinarily carried out at temperatures of about 700° C. to 1000° C. On the other hand, the catalytic reduction of nitrobenzene to aniline with hydrogen is exothermic and is usually conducted at temperatures not over about 400° C. It has been found in accordance with the present invention that, if the reducing gases are generated in situ in the presence of the nitrobenzene, the endothermic and exothermic reactions associated with the water gas reaction and the reduction reaction respectively, are counter-balanced, and that the whole reaction, including the generation of the reducing gas and the reduction of the nitrobenzene, take place in one step and occur at remarkably low temperatures.

The reduction of the nitrobenzene, according to the present invention, may be successfully carried out at temperatures ranging from about 200° C. to 400° C., and preferably at a temperature range of about 250° C. to 350° C. Below about 200° C. the extent of the reduction is slight, resulting in low conversion yields; above about 400° C. the reduction is complete, the products being substantially benzene and ammonia.

The single figure of drawing is a diagrammatical sketch showing an elevation partly in section of one form of apparatus suitable for carrying out the process of the invention.

Referring to the drawings, water is fed from a tank 1 through the line 2 to a heating coil 3 located in a steam boiler 4. The steam generated in the coil passes through the line 7 to preheater 8 wherein the steam is superheated in a coil 9 to a temperature of around 300° C.–400° C. Nitrobenzene from the feed tank 10 is forced by pump 11 through the line 12 to a coil 13 located in heat exchanger 14 where it is preheated by heat exchange with vapors from the reactor 15. The preheated nitrobenzene is then charged through line 16 to a heating coil 17 located in a heater 18. The nitrobenzene is vaporized in the coil 17 and the vapors are passed through the line 19 to a coil 20 located in the preheater 21. The vapors of nitrobenzene from the coil 20 are conducted through line 22 to a common pipeline 24 wherein they are commingled with the steam from preheater 8.

The mixture of steam and nitrobenzene vapors are conducted through the pipeline 24 to the lower portion of reactor 15 wherein it passes upward through a bed of carbon 26, which may or may not contain a catalyst, supported on a perforated plate 28.

The reactor 15 is usually maintained under a small superatmospheric pressure, such as about 10 lbs. per sq. in. and at a temperature of around 200° C.–400° C.

The vapors are released from the top of the reaction chamber 15 through line 30 and passed to the heat exchanger 14 where the heat of the vapors is transferred to the nitrobenzene feed passing through the coil 13. The partially cooled vapors are then conducted through the line 32 to a condenser 35. The condensate from the condenser 35 flows through the line 36 to a separator 38 wherein the product separates into an upper layer of crude aniline and a lower layer of water and nitrobenzene containing dissolved aniline. The crude aniline may be drawn off through the line 40. The water, nitrobenzene and dissolved aniline are passed through the line 41 to the lower portion of a scrubber 42. In the scrubber the water, nitrobenzene and dissolved aniline are contacted with a descending stream of nitrobenzene, introduced into the upper portion of the scrubber through a line 44 from the tank 10. The nitrobenzene scrubs out the aniline, leaving the water which is discharged from the top of the scrubber through the line 45. The solution of nitrobenzene and aniline is drawn from the bottom of the scrubber through the line 46 for recycling in the system.

The carbon used in the reactor 15 may be any of the well known forms including coke, activated carbon, carbon black, etc. If necessary the carbon may be pelleted or otherwise treated to obtain proper contact with the vapors.

If a catalyst is used with the carbon, any well known or preferred hydrogenation catalyst is suitable, such as nickel pellets, finely divided tin and tin oxide, copper and zinc carbonates, iron, cobalt and platinum metals. It should be distributed throughout the carbon.

The amount of catalyst may vary but it is preferable that a large excess of carbon be used. A ratio of one part nickel catalyst to 10 parts of carbon has been found satisfactory but the ratio of catalyst to carbon may vary from 1 to 10 parts to 10 to 1 part.

When a catalyst is used in the reduction bed 26, the

Example I

As an example of the operation of the invention, a mixture of steam and nitrobenzene vapors in the ratio of about 3 parts of water to one part of nitrobenzene were passed through a reaction chamber containing a mixture of pelletized active carbon and a nickle hydrogenation catalyst. The ratio of active carbon to nickel in the catalyst mixture was about 10 to 1. The temperature in the reaction chamber was maintained at about 250° C. to 270° C. About 45% of the nitrobenzene was converted into aniline in one pass through the catalyst.

Example II

Vapors of nitrobenzene and steam in approximately the same proportions as in Example I were passed separately into a reaction chamber. The chamber contained a catalyst bed, the lower one-third of which was active carbon and the upper two-thirds was a mixture of active carbon and nickel hydrogenation catalyst in the ratio of about 10 to 1. The steam was introduced into the lower portion of the bed of active carbon and the nitrobenzene vapors into the lower portion of the mixture of active carbon and nickel catalyst. The active carbon portion of the catalyst bed was maintained at about 250° C.–270° C. The temperature of the upper portion of the catalyst bed ranged from about 280° C.–320° C. at the bottom to 400° C.–415° C. at the top. The vapors leaving the reactor were about 150° C.–180° C. The yield of aniline was about 46% in one pass through catalyst.

Example III

Vapors of steam and nitrobenzene were passed separately into a reaction chamber containing pelletized carbon only. The steam was introduced into the lower portion of reaction chamber, and the nitrobenzene vapors were introduced at a point about one-third up the length of the chamber. The temperature of the lower one-third of the reaction chamber was maintained at about 250° C.–270° C. and the temperature of the upper two-thirds at about 280° C.–320° C. About 48% of the nitrobenzene was converted into aniline in one pass through the reaction chamber.

Example IV

The procedure of Example II was repeated with the exception that instead of one pass through the catalyst, the vapors leaving the reaction chamber were fractionated and the unconverted nitrobenzene was recycled in the system. The yield of aniline amounted to 96% of the nitrobenzene consumed.

The flow rate of the nitrobenzene through the reaction chamber is not critical and may vary widely as long as there is good contact between the vapors and the carbon or catalyst. It has been found that a throughput equivalent to about 1200 lbs. per hour for a commercial size unit with a reaction chamber 4 feet in diameter and 10 feet high gives satisfactory results.

The process may be operated continuously to advantage. For this purpose, it is contemplated that two or more reactors may be provided whereby one reactor may be cut out at any time for renewing or regenerating the carbon or catalyst without interrupting the operation. It is also contemplated that a fluidized bed of catalyst may be used whereby recharging of the catalyst to the reactor and renewing or regenerating of the catalyst may be done according to well known principles of fluidized catalyst operation.

Instead of nitrobenzene, other nitro compounds such as aromatic polynitro compounds, alkyl nitro aromatics, nitro phenols, or halogenated nitro aromatics may be used. For example, alpha or beta nitronaphthalene, dinitro benzenes, nitro toluenes, o-nitro phenol, nitro chlorobenzenes may be reduced to the corresponding amines. In the case of the dinitro compounds, the conditions of the reduction may be controlled so as to give nitro amines such as p-nitro aniline from dinitro benzene; further, in the use of nitro-benzene, the reduction may be controlled to give intermediate reduction products such as hydrazobenzene or azobenzene. It will be understood, of course, that temperature and pressure conditions may have to be adjusted, depending on the boiling points of the materials, but one skilled in the art will be able to make such adjustments in view of the present disclosure and the illustrative examples.

It is sometimes advantageous to operate the reaction chamber under a substantial superatmospheric pressure of the order of 10 to 100 pounds per square inch or more. Also, flow rates may be varied to produce optimum yields.

Obviously many modifications of the invention will occur to one skilled in the art and therefore it is intended that all such modifications are included within the scope of the invention and only such limitations are to be imposed as are specified in the following claims.

I claim:

1. The method of converting aromatic nitro compounds to aromatic amines which comprises: subjecting vapors of steam and a compound selected from the class consisting of nitrobenzenes and nitronaphthalenes to the action of finely divided carbon, while maintaining the compounds in the vapor phase and at temperatures of about 200–400° C. at which hydrogen is generated in situ, and continuing the reaction for sufficient time to reduce the nitro compounds to amines by the generated nascent hydrogen.

2. The method of converting aromatic nitro compounds to aromatic amines which comprises contacting a compound selected from the class consisting of nitrobenzenes and nitronaphthalenes in the vapor phase and in the presence of steam with finely divided carbon and an hydrogenation catalyst at temperatures of about 200–400° C. and under conditions such that nascent hydrogen is generated in situ and the nitro compounds are reduced to the amines, and separating the amines from the reaction products.

3. The method of producing aniline from nitrobenzene which comprises: contacting vapors of nitrobenzene and steam with active carbon and maintaining the temperature in the range of about 200–400° C. whereby hydrogen is generated in situ and the nitrobenzene is reduced to aniline by the generated nascent hydrogen.

4. The method according to claim 3 in which the temperature is about 250–350° C.

5. The method of producing alpha naphthylamine from alpha nitronaphthalene which comprises: contacting vapors of alpha nitronaphthalene and steam with active carbon and maintaining the temperature in the range of abotu 200–400° C. whereby hydrogen is generated in situ and the alpha nitronaphthalene is reduced to alpha naphthylamine by the generated nascent hydrogen.

6. The method of producing o-aminophenol from o-nitrophenol which comprises: contacting vapors of o-nitrophenol and steam with active carbon and maintaining the temperature in the range of about 200–400° C. whereby hydrogen is generated in situ and the o-nitrophenol is reduced to o-aminophenol by the generated nascent hydrogen.

References Cited in the file of this patent

UNITED STATES PATENTS

| | | |
|---|---|---|
| 1,530,392 | Morrell | Mar. 17, 1925 |
| 1,842,197 | Portail | Jan. 19, 1932 |
| 1,845,280 | Jaeger | Feb. 16, 1932 |
| 1,960,951 | Oppenhiem | May 29, 1934 |
| 2,039,259 | Pier et al. | Apr. 28, 1936 |
| 2,459,907 | Winslow et al. | Jan. 25, 1949 |
| 2,578,328 | Von Bramer et al. | Dec. 11, 1951 |